United States Patent
Lee et al.

(10) Patent No.: US 8,345,967 B2
(45) Date of Patent: Jan. 1, 2013

(54) APPARATUS AND METHOD OF PROCESSING IMAGE, AND RECORD MEDIUM FOR THE METHOD

(75) Inventors: Tae-Hee Lee, Seoul (KR); Byoung-Kwang Kim, Gyeongsangnam-do (KR); Woo-Jin Song, Gyeongbuk (KR)

(73) Assignee: Postech Academy—Industry Foundation, Gyeongbuk (KR)

( * ) Notice: Subject to any disclaimer, the term of this patent is extended or adjusted under 35 U.S.C. 154(b) by 469 days.

(21) Appl. No.: 12/615,773

(22) Filed: Nov. 10, 2009

(65) Prior Publication Data

US 2010/0208985 A1  Aug. 19, 2010

(30) Foreign Application Priority Data

Feb. 17, 2009  (KR) ........................ 10 2009 0012740

(51) Int. Cl.
  *G06K 9/00*  (2006.01)
(52) U.S. Cl. ....................................................... 382/163
(58) Field of Classification Search .......... 382/162–163, 382/165–167; 358/1.9, 2.1, 521, 523; 345/690
  See application file for complete search history.

(56) References Cited

U.S. PATENT DOCUMENTS

| | | | | |
|---|---|---|---|---|
| 6,757,426 B2 * | 6/2004 | Link et al. | ...................... | 382/163 |
| 7,382,915 B2 * | 6/2008 | Bala et al. | ...................... | 382/162 |
| 7,542,055 B2 * | 6/2009 | Matsuda et al. | .............. | 345/690 |
| 7,760,399 B2 * | 7/2010 | Lin | .............................. | 358/3.07 |
| 8,073,248 B2 * | 12/2011 | Brunner et al. | ............... | 382/165 |

OTHER PUBLICATIONS

Gooch, A, et al., "Color2Gray: Salience-Preserving Color Removal", The Association for Computing Machinery, Inc., Jul. 2005, 6 pages.
Rasche, K., et al., "Re-coloring Images for Gamuts of Lower Dimension", The Eurographics Association and Blackwell Publishing, vol. 24, No. 3, Sep. 2005, 10 pages.
Smith, K, et al, "Apparent Greyscale: A Simple and Fast Conversion to Perceptually Accurate Images and Video", The Eurographics Association and Blackwell Publishing, vol. 27, No. 2, Apr. 2008, 8 pages.

* cited by examiner

*Primary Examiner* — Jose Couso
(74) *Attorney, Agent, or Firm* — Osha Liang LLP

(57) ABSTRACT

A method and apparatus for processing an image to create a grayscale image are provided. The method includes converting, in a color image consisting of a plurality of pixels, a pixel value of each pixel in a RGB color space into a pixel value in a new color space through color space conversion, extracting color information using the pixel value in the new color space, calculating a luminance change amount of each pixel using the extracted color information, calculating a luminance value for the grayscale image by combining an original luminance value of each pixel and the luminance change amount, and creating the grayscale image according to the calculated luminance value. In converting color image into grayscale image and representing the grayscale image, the luminance change amount is set according to a property of each color perceived by humans and added to original luminance value, thereby explicitly discriminating among objects.

11 Claims, 7 Drawing Sheets

FIG. 1a

Color pattern image

FIG. 1b

Conventional grayscale image

Conventional grayscale image

FIG. 5b

Inventive grayscale image

APPARATUS AND METHOD OF PROCESSING IMAGE, AND RECORD MEDIUM FOR THE METHOD

CROSS-REFERENCE TO RELATED APPLICATION

This application claims the benefit under 35 U.S.C. §119 (a) of Korean Patent Application No. 2009-12740, filed on Feb. 17, 2009, the disclosure of which is incorporated herein in its entirety by reference.

BACKGROUND

1. Technical Field

The present invention relates to an apparatus and method of processing an image.

2. Description of the Related Art

In a computer system serving as a host for a printer, a monitor or the like (hereinafter, referred to as a "representing device"), an image representing device controls operation of the representing device in response to an instruction from a user. Specifically, the image representing device creates data for an image including pictures, texts, or the like that can be processed by the representing device (hereinafter, referred to as "data to be represented"), and transmits the data to the representing device so that the data can be represented on a representation medium such as a screen or papers.

The represented image may be a color image that may be represented in RGB. According to a user's preference or performance of a representation medium, the image may be represented as a grayscale image that is a black-and-white image. Here, the grayscale image refers to an image having pixels each represented by single hues having a brightness (luminance) value, for example, from 0 to 255.

Normally, a grayscale image may be created by using only a luminance component in a color space such as $YC_BC_R$, $YP_BP_R$ or hue saturation lightness (HSL). For example, an image processing apparatus may convert an original RGB color space into the luminance component using the Y component of $YC_BC_R$ color space.

Figure 1A:
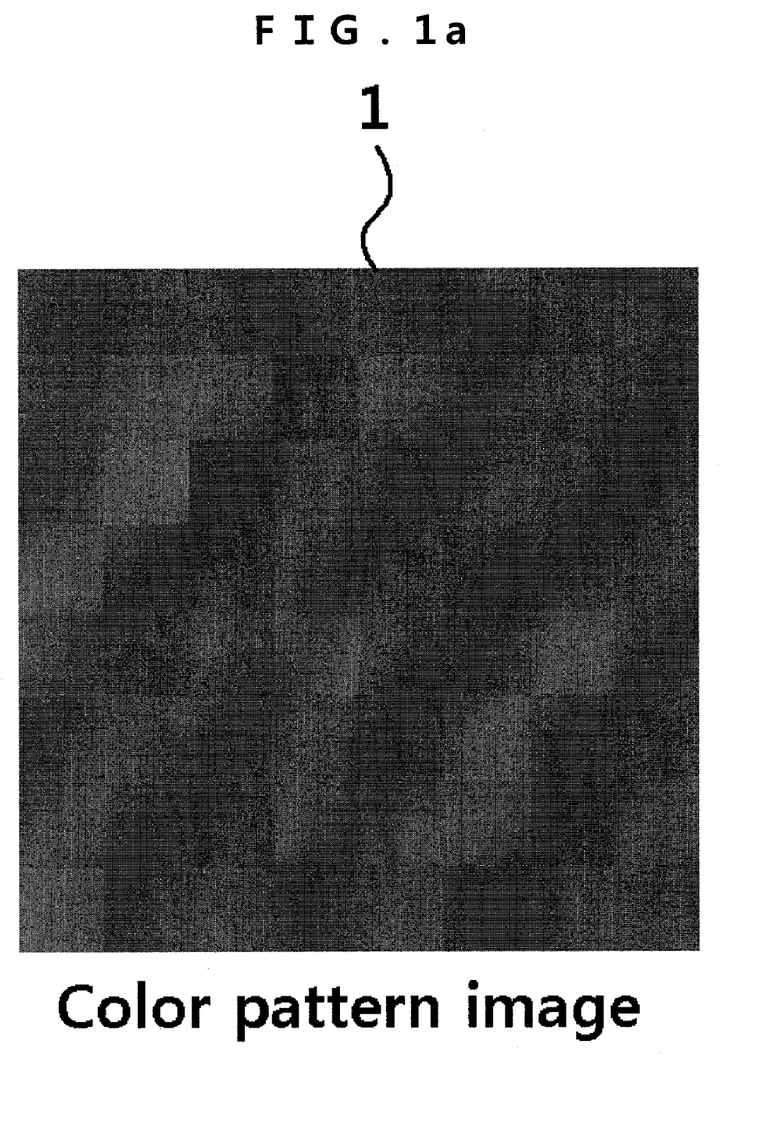
FIG. 1a illustrates an image consisting of small squares having various colors.

However, since a conventional method of creating a grayscale image converts, for example, an image in a RGB color space into the image in the Y component while discarding a $C_BC_R$ component, when objects have the same luminance and different colors, a grayscale image is created with the objects having the same luminance, such that objects cannot be discriminated in a represented result. FIG. 1a illustrates an image consisting of small squares having various colors, and FIG. 1b illustrates a result of representing the image of FIG. 1a using the only Y component.

Figure 1B:
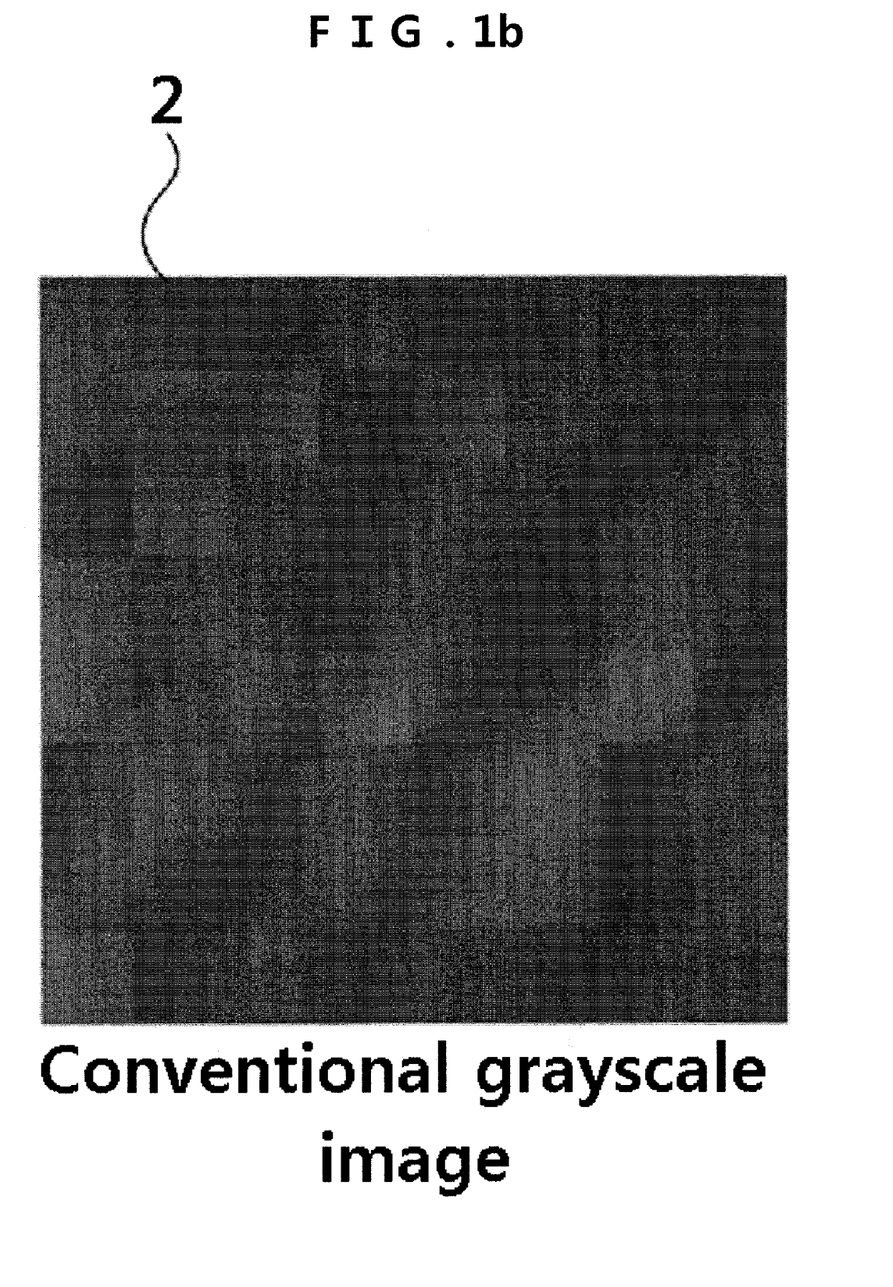
FIG. 1b illustrates a result of representing the image of FIG. 1a using a conventional method of creating a grayscale image.

Even when colors have some differences in luminance, as shown in FIG. 1b, it is generally difficult to discriminate among small squares due to lost chrominance components.

SUMMARY

The present invention is directed to an apparatus and method of processing an image that are capable of enabling objects to be explicitly discriminated by reflecting a property of a color perceived by humans in converting a color image into a grayscale image, and a recording medium for the method of processing an image.

Generally, humans perceive colors in the reddish colors as warmer and more prominent than colors in the bluish colors when the colors have the same luminance value. The present invention reflects such a property of the colors perceived by humans in creating a grayscale image.

According to some example embodiments of the present invention, a method of processing an image to create a grayscale image includes: converting, in a color image consisting of a plurality of pixels, a pixel value of each pixel in a RGB color space into a pixel value in a new color space through color space conversion; extracting color information using the pixel value in the new color space; calculating a luminance change amount of each pixel using the extracted color information; and calculating a luminance value for the grayscale image by combining an original luminance value of each pixel and the luminance change amount, and creating the grayscale image according to the calculated luminance value.

Here, converting the pixel value may include performing the linear conversion according to the following equation:

$$m_1 = \alpha_1 * R + \alpha_2 * G + \alpha_3 * B + \alpha_4$$

and, $$m_2 = \beta_1 * R + \beta_2 * G + \beta_3 * B + \beta_4,$$

where $m_1$ denotes a chrominance component value of the reddish colors, $m_2$ denotes a chrominance component value of the bluish colors, and $\alpha_1$, $\alpha_2$, $\alpha_3$, $\alpha_4$, $\beta_1$, $\beta_2$, $\beta_3$ and $\beta_4$ denote constants for the linear conversion.

Extracting the color information may include generating color information ($m_1-m_2$) to use to indicate a human-perceived property of the color.

Calculating the luminance change amount may performed by the following equation:

$$f(m_1-m_2) = k * \text{sgn}(m_1-m_2) * |m_1-m_2|^\alpha,$$

where $f(m_1-m_2)$ denotes the luminance change amount, and k and $\alpha$ are positive numbers.

The new color space may be one of the color spaces such as $YP_BP_R$ and $YC_BC_R$ through linear conversion and the color spaces such as HSL through nonlinear conversion.

According to another example embodiments of the present invention, an apparatus for processing an image to create a grayscale image includes: a color space converter configured to convert, in a color image consisting of a plurality of pixels, a pixel value of each pixel in a RGB color space into a pixel value in a new color space through color space conversion; a color information extractor configured to extract color information using the pixel value in the new color space; a pixel luminance change amount calculator configured to calculate a luminance change amount of each pixel using the extracted color information; and a grayscale image creator configured to combine an original luminance value of each pixel and the luminance change amount for the pixel, and create the grayscale image according to the calculated luminance values.

Here, the color space converter may perform the linear conversion according to the following equations and also calculate a luminance component (not included in the equations):

$$m_1 = \alpha_1 * R + \alpha_2 * G + \alpha_3 * B + \alpha_4$$

and, $$m_2 = \beta_1 * R + \beta_2 * G + \beta_3 * B + \beta_4,$$

where $m_1$ denotes a chrominance component value of the reddish colors, $m_2$ denotes a chrominance component value of the bluish colors, and $\alpha_1$, $\alpha_2$, $\alpha_3$, $\alpha_4$, $\beta_1$, $\beta_2$, $\beta_3$ and $\beta_4$ denote constants for the linear conversion.

The color information extractor may generate color information $(m_1-m_2)$ to use to indicate a human-perceived property of the color.

The luminance change amount calculator may calculate the luminance change amount using the following equation:

$$f(m_1-m_2)=k*\text{sgn}(m_1-m_2)*|m_1-m_2|^\alpha,$$

where $f(m_1-m_2)$ denotes the luminance change amount, and k and $\alpha$ are positive numbers.

The new color space may be one of the color spaces such as $YP_BP_R$ and $YC_BC_R$ through linear conversion and the color spaces such as HSL through nonlinear conversion.

According to still another some example embodiments of the present invention, a recording medium having a program of instructions recorded thereon, tangibly implemented, and readable and executable by an apparatus for processing an image to create a grayscale image is provided, wherein the program performs: converting, in a color image consisting of a plurality of pixels, a pixel value of each pixel in a RGB color space into a pixel value in a new color space through color space conversion; extracting color information using the pixel value in the new color space; calculating a luminance change amount of each pixel using the extracted color information; and calculating a luminance value for the grayscale image by combining an original luminance value of each pixel and the luminance change amount, and creating the grayscale image according to the calculated luminance value.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain aspects of the invention.

DETAILED DESCRIPTION OF EMBODIMENTS

While example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms used therein including technical or scientific terms have meanings understood by those skilled in the art. Terms generally defined in dictionaries should be construed as having a meaning on a context of related schemes, and not as having an abnormally or inordinately formal meaning, unless clearly defined.

Example embodiments of the present invention will be described in greater detail with reference to the accompanying drawings. Like numbers refer to like elements throughout the description of the figures and the same components will not be described further.

Figure 2:
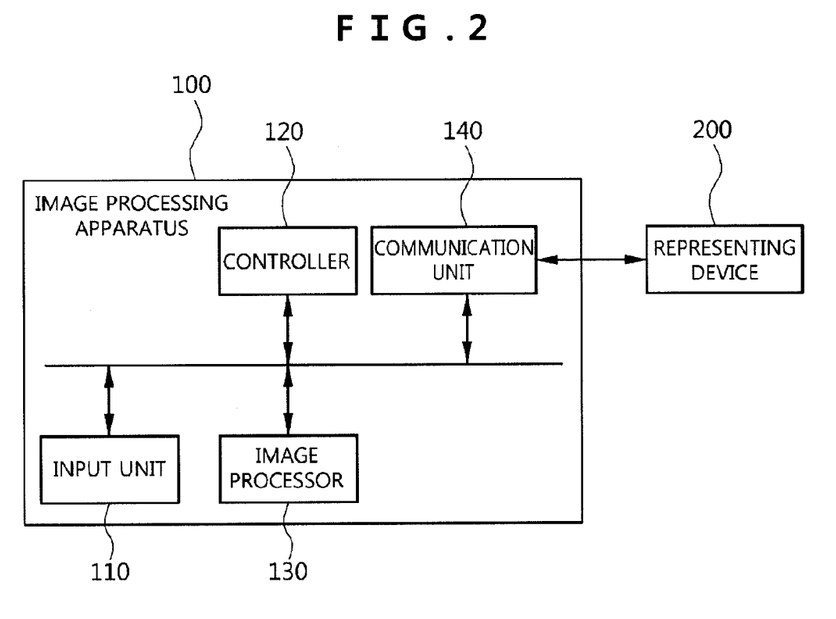
FIG. 2 is a block diagram of an image processing apparatus according to an example embodiment of the present invention.

In the following detailed description, a grayscale image refers to an image having pixels each represented by single hues having, for example, a luminance value from 0 to 255, as known to those skilled in the art. FIG. 2 is a block diagram of an image processing apparatus according to an example embodiment of the present invention. An image processing apparatus 100 is embodied by a computer system serving as a host for the representing device 200. The image processing apparatus 100 provides data to be represented, of an image such as a picture, photograph, text, and the like to the representing device 200, and controls operation of the representing device 200.

The image processing apparatus 100 includes an input unit 110, an image processor 130, a communication unit 140, and a controller 120, as shown in FIG. 2. The input unit 110 receives an instruction to represent data from a user and delivers the instruction to the controller 120. The input unit 110 may be a keyboard, mouse, or the like.

Under control of the controller 120, the communication unit 140 communicates with the representing device 200. The communication unit 140 may be a network card. The controller 120 performs overall control of the image processing apparatus 100. Upon receipt of a request for representation from a user, the controller 120 transmits the data of the image to be represented to the representing device 200.

The controller 120 may be a computer program. In this case, the controller 120 may include a memory such as a read only memory (ROM; not shown) for storing a computer program, and a CPU (not shown) and a RAM (not shown) for execution of the computer program.

The image processing apparatus 100 may further include a unit (not shown) for performing correction and halftoning on a created grayscale image and then converting a resultant image into a printer language that can be printed by the representing device 200.

Under control of the controller 120, the image processor 130 performs image processing on the image to be represented. According to the present invention, the image processor 130 converts a pixel value of each pixel in a RGB color space in a color image consisting of a plurality of pixels into a pixel value in a new color space, and extracts color information from the new color space. In this case, the color information may be extracted from the color space through linear conversion. The color space includes $YC_BC_R$, $YP_BP_R$, and the like. That is, the image processor 130 may extract the color information from any color space through linear conversion related to the color image.

The image processor 130 calculates a luminance change amount using the extracted color information. Specifically, a grayscale image is created by using a gray scale according to a luminance component value. In a conventional scheme, pixels having the same luminance component value in an image have the same gray scale. In the present invention, even when pixels have the same luminance component value, the pixels may have different gray scale according to their colors. That is, pixels represented as the same on the gray scale in the grayscale image may be represented differently on the gray scale according to their colors.

For this, in the present invention, the luminance change amount is produced based on the color information to produce a luminance value used to produce the grayscale image. The luminance change amount reflects a human's perception of colors.

Specifically, the perceived-color property by humans, as used herein, is that humans perceive the reddish colors as warmer and more prominent than the bluish colors. This property results from a fact that colors in the reddish colors such as red, orange, and yellow are warm colors, which are perceived as warm and cause excitement, and colors in the bluish colors such as cyan, blue, and celadon are cold colors, which are perceived as cold, and mitigate excitement.

Thus, the present invention defines a scheme for making colors in the reddish colors brighter in a grayscale image and colors in the bluish colors darker, by using the above-described features and a feature that brighter colors are perceived as lighter. In order to reflect the features of colors in the reddish colors and colors in the bluish colors, $m_1-m_2$ is calculated using $m_1$ and $m_2$ indicating a red chrominance component value and a blue chrominance component value of a color, respectively, and is used as the color information. The configuration of the image processor 130 will be described with reference to FIG. 3.

Figure 3:
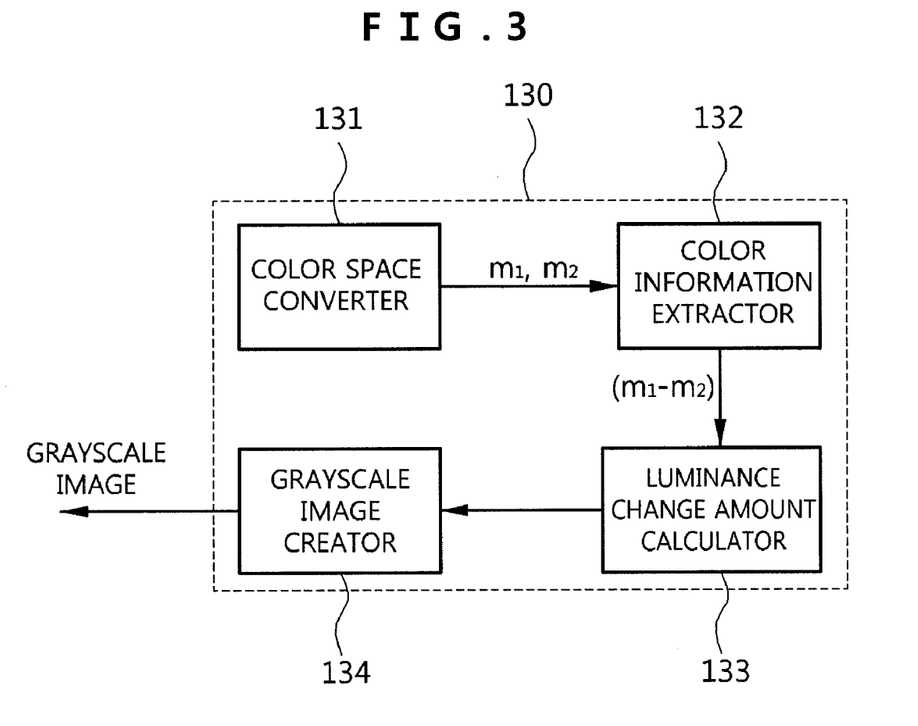
FIG. 3 is a block diagram of an image processor 130 according to an example embodiment of the present invention.

FIG. 3 is a block diagram of the image processor 130 according to an example embodiment of the present invention.

The image processor 130 converts a RGB color space into a color space including a luminance component and a chrominance component in order to discriminate between the colors in the reddish colors and the colors in the bluish colors, extracts color information from the resultant color space, obtains a luminance change amount of colors using the color information, and reflects the luminance change amount to an original luminance value of the corresponding color. Thus, according to a conventional scheme, colors having the same luminance value have the same gray value while in the present invention, colors having the same luminance value may have different gray values according to color information.

Referring to FIG. 3, according to an example embodiment of the present invention, the image processor 130 includes a color space converter 131, a color information extractor 132, a luminance change amount calculator 133, and a grayscale image creator 134.

The color space converter 131 converts a pixel value of each pixel in a RGB color space in a color image into a pixel value of a new color space including chrominance components $m_1$ and $m_2$, and the luminance component $m_3$ using Equation 1:

$$m_1 = \alpha_1 * R + \alpha_2 * G + \alpha_3 * B + \alpha_4,$$

$$m_2 = \beta_1 * R + \beta_2 * G + \beta_3 * B + \beta_4 \text{ and,}$$

$$m_3 = \gamma_1 * R + \gamma_2 * G + \gamma_3 * B + \gamma_4, \qquad \text{Equation 1}$$

where $m_1$ denotes a chrominance component value of the reddish colors, and $m_2$ denotes a chrominance component value of the bluish colors. Here, $\alpha_1, \alpha_2, \alpha_3, \alpha_4, \beta_1, \beta_2, \beta_3$ and $\beta_4$ denote constants for linear conversion. $m_3$ denotes the original luminance component value, and $\gamma_1, \gamma_2, \gamma_3$ and $\gamma_4$ may be constants for linear conversion or variables for nonlinear conversion.

The color information extractor 132 extracts the color information and then outputs the color information to the luminance change amount calculator 133.

The luminance change amount calculator 133 calculates the luminance change amount of each pixel based on the extracted color information. That is, the luminance change amount calculator 133 calculates the luminance change amount using color information $(m_1-m_2)$ by the exponential function of the color information.

The luminance change amount calculator 133 calculates the luminance change amount based on the color information $(m_1-m_2)$ value using Equation 2:

$$\Delta m_3 = f(m_1 - m_2). \qquad \text{Equation 2}$$

The luminance change amount $\Delta m_3$ is calculated using Equation 3:

$$f(m_1 - m_2) = k * \text{sgn}(m_1 - m_2) * |m_1 - m_2|^\alpha. \qquad \text{Equation 3}$$

In Equation 2, $\Delta m_3$ denotes the luminance change amount, and in Equation 3, k and $\alpha$ are positive numbers. In order for the reddish colors to have a brighter gray value than the bluish colors, an equation for allocating the luminance change amount to the color is a monotonic increasing function proportional to $(m_1-m_2)$.

Since an achromatic color does not have a chrominance component, $(m_1-m_2)=0$ and a luminance change amount $f(m_1-m_2)=f(0)=0$. Also, for purple or green, in which the perceived-color property by humans is neutral, and $(m_1-m_2)=0$.

Meanwhile, in another example embodiment of the present invention, $\alpha$ in Equation 3 may be adjusted to cause a small change in the luminance when $(m_1-m_2)$ has a large value and prevent an excessive change in the luminance when $(m_1-m_2)$ has a large value.

The luminance change amount calculator 133 calculates the luminance change amount and then outputs the luminance change amount to the grayscale image creator 134, as described above.

The grayscale image creator 134 combines the luminance change amount from the luminance change amount calculator 133 and the luminance value $m_3$ to create a resultant grayscale image. In this case, a luminance value P indicating the grayscale image is generated by using the luminance $m_3$ and the luminance change amount $\Delta m_3$, as shown in Equation 4:

$$P = m_3 + \Delta m_3. \qquad \text{Equation 4}$$

Since the luminance change amount $\Delta m_3$ is included in Equation 4, Equation 5 is derived by applying Equations 2 and 3 to Equation 4:

$$P = m_3 + k*\text{sgn}(m_1-m_2)*|m_1-m_2|^\alpha. \quad \text{Equation 5}$$

That is, the grayscale image creator 134 calculates a luminance value P for creating a grayscale image using Equation 5, and creates the grayscale image using the luminance value P.

Thus, the grayscale image creator 134 may create the grayscale image reflecting the chrominance component by setting the luminance change amount dependent on the property of the color perceived by humans.

For example, when a $YC_BC_R$ color space is used, the image processor converts an image in a RGB color space into an image in the $YC_BC_R$ color space consisting of a luminance value and a chrominance component, and extracts color information $C_B$ and $C_R$ from the $YC_BC_R$ color space. The image processor 130 calculates the luminance change amount considering the relation between the chrominance and the luminance in human feeling, using Equation 6:

$$f(C_R-C_B) = k*\text{sgn}(C_R-C_B)*|C_R-C_B|^\alpha. \quad \text{Equation 6}$$

Figure 4:
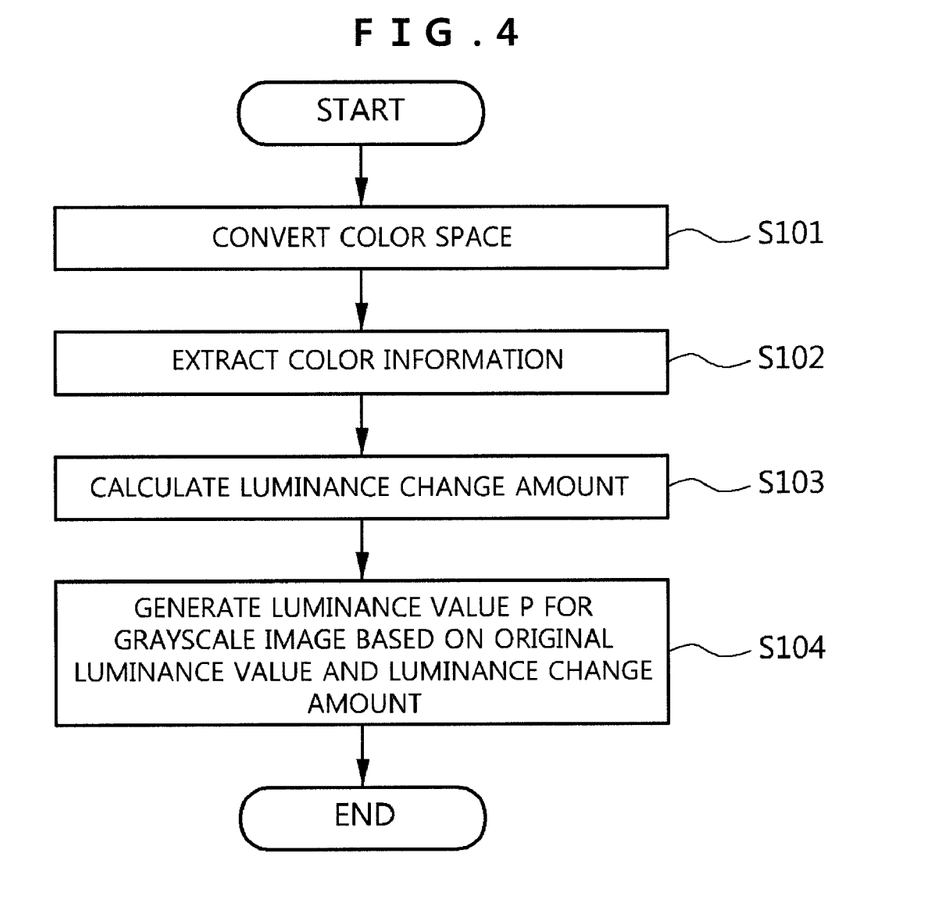
FIG. 4 is a flowchart illustrating a method of creating a grayscale image in an image processing apparatus according to an example embodiment of the present invention.

FIG. 4 is a flowchart illustrating a method of creating a grayscale image in an image processing apparatus according to an example embodiment of the present invention.

Referring to FIG. 4, upon receipt of a request for grayscale image output, the image processing apparatus converts the RGB color space in the new color space consisting of a luminance component value and a chrominance component, in step S101.

The image processing apparatus then calculates color information used to indicate a property of a color according to the present invention, based on the chrominance component in step S102. As described above, the image processing apparatus calculates color information $(m_1-m_2)$ using $m_1$ and $m_2$ that indicate red and blue chrominance component values of a color, respectively.

As described above, the present invention uses a scheme of making colors in the reddish colors brighter and colors in the bluish colors darker in a grayscale image. The image processing apparatus calculates $(m_1-m_2)$ using $m_1$ and $m_2$ indicating the red and blue chrominance component values, respectively, of the color and uses $(m_1-m_2)$ as color information in order to reflect features of colors in the red and bluish colors.

The image processing apparatus then calculates a luminance change amount of each pixel using the color information $(m_1-m_2)$ indicating a property of a color in step S103.

The image processing apparatus calculates a luminance change amount using an exponential function for color information $(m_1-m_2)$ reflecting the property of the color perceived by humans in step S103. The image processing apparatus then combines a luminance value $m_3$ and a luminance change amount $\Delta m_3$ for each pixel to create an inventive luminance value for explicitly discriminating among objects, i.e., the luminance value P for a grayscale image in step S104.

Thus, the present invention calculates an inventive luminance value reflecting feeling of people for colors with respect to the luminance value of each pixel in an image and creates the grayscale image based on the luminance value.

Figure 5A:
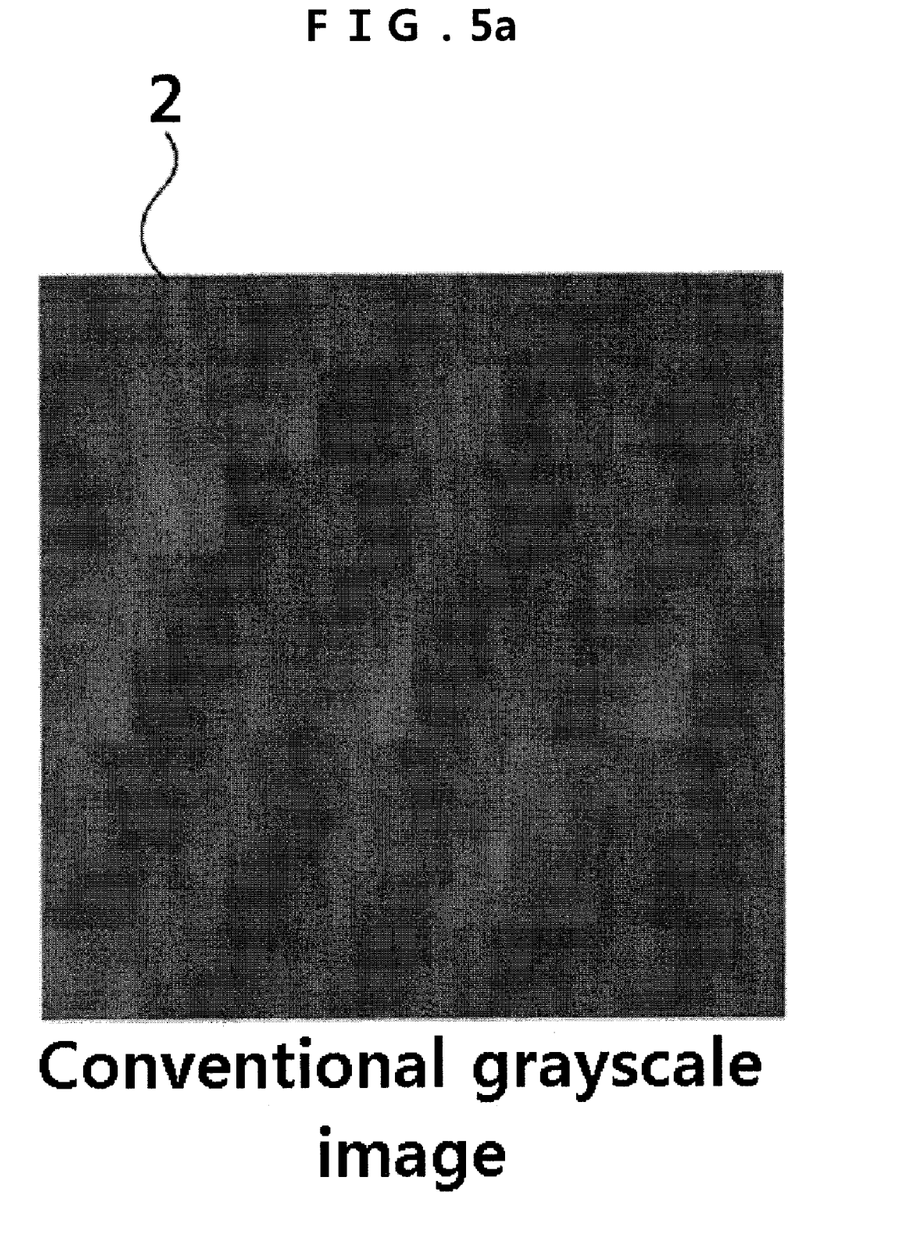
FIG. 5a illustrates a grayscale image according to a conventional method.
Figure 5B:
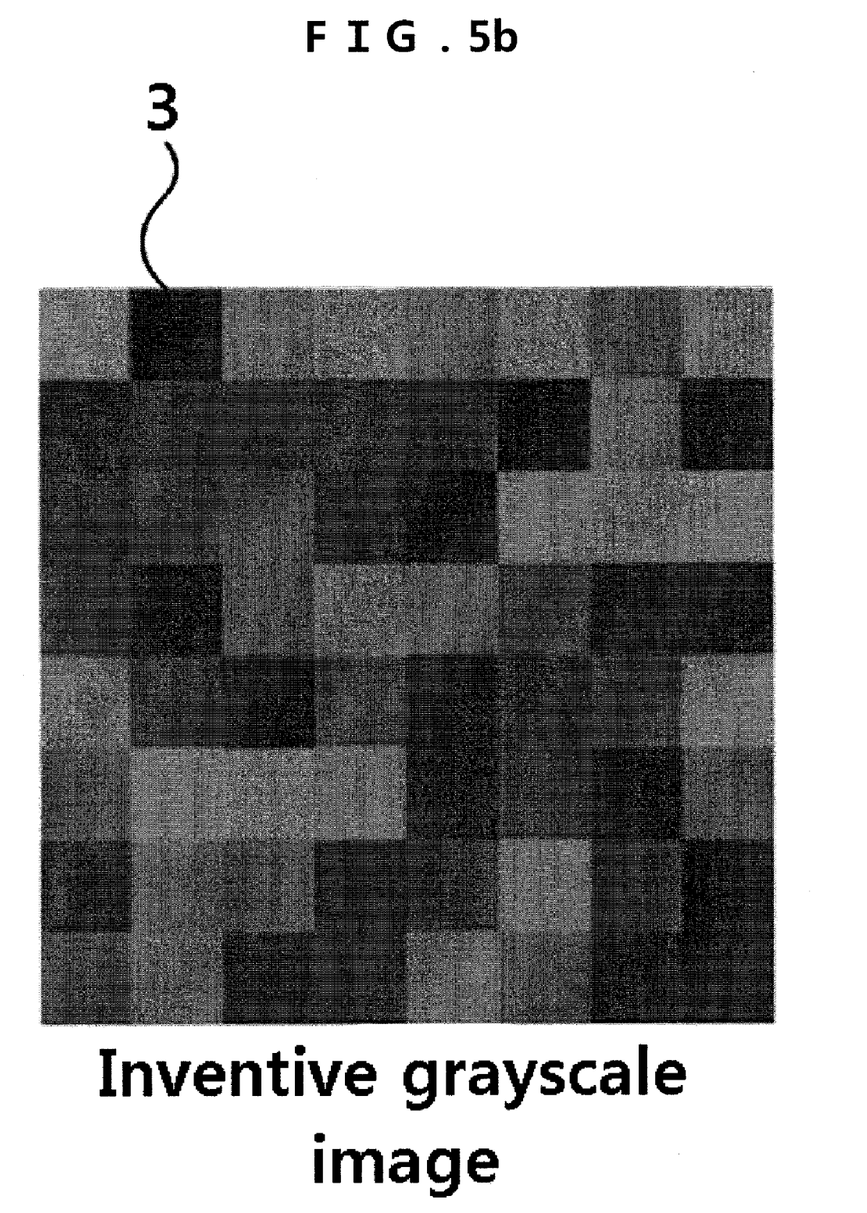
FIG. 5b illustrates a grayscale image according to the present invention.

FIG. 5a illustrates a grayscale image according to a conventional method. FIG. 5b illustrates a grayscale image according to the present invention, i.e., a grayscale image 3 represented by converting the color image 1 in FIG. 1a into a grayscale image using the method of processing an image according to the present example embodiment. It can be seen from a comparison between the grayscale image 2 in FIG. 5a according to a conventional method and the grayscale image 3 that it is difficult to discriminate small squares in the grayscale image 2 due to their similar luminance even though they have different colors, while it is easy to discriminate small squares of the grayscale image 3 in FIG. 5b because the small squares have relatively different luminance.

It will be apparent to those skilled in the art that the present invention may be applied to any color space in color space conversion for extracting the color information. For example, the color information can be extracted in a color space such as $YP_BP_R$ and $YC_BC_R$ obtained through linear conversion in the RGB color space and a color space such as HSL obtained through nonlinear conversion.

As described above, in converting a color image into a grayscale image and representing the grayscale image, the luminance change amount is set according to a property of each color perceived by humans and added to an original luminance value, thereby explicitly discriminating among objects.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of creating a grayscale image using an image processing apparatus (IPA), the method comprising:
    converting, in a color image consisting of a plurality of pixels, a pixel value of each pixel in a RGB color space into a pixel value in a new color space through linear conversion;
    extracting, using the IPA, color information using the pixel value in the new color space;
    calculating, using the IPA, a luminance change amount of each pixel using the extracted color information; and
    calculating, using the IPA, a luminance value for the grayscale image by combining an original luminance value of each pixel and the luminance change amount, and creating the grayscale image according to the calculated luminance value,
    wherein the extracted color information reflects the features of colors in the reddish colors and colors in the bluish colors to make colors in the reddish colors brighter in the grayscale image than colors in the bluish color.

2. The method of claim 1, wherein converting the pixel value comprises performing the linear conversion according to the following equations:

$$m_1 = \alpha_1*R + \alpha_2*G + \alpha_3*B + \alpha_4 \text{ and,}$$

$$m_2 = \beta_1*R + \beta_2*G + \beta_3*B + \beta_4,$$

where $m_1$ denotes a chrominance component value of the reddish colors, $m_2$ denotes a chrominance component value of the bluish colors, and $\alpha_1$, $\alpha_2$, $\alpha_3$, $\alpha_4$, $\beta_1$, $\beta_2$, $\beta_3$ and $\beta_4$ denote constants for the linear conversion.

3. The method of claim 2, wherein extracting the color information comprises generating color information $(m_1-m_2)$ to use to indicate a human-perceived property of the color.

4. The method of claim 2, wherein calculating the luminance change amount comprises calculating the luminance change amount using the following equation:

$$f(m_1-m_2) = k*\text{sgn}(m_1-m_2)*|m_1-m_2|^\alpha,$$

where $f(m_1-m_2)$ denotes the luminance change amount, and k and a are positive numbers.

5. The method of claim 1, wherein the new color space comprises one of color spaces including $YP_BP_R$ and $YC_BC_R$ through linear conversion and color spaces including hue saturation lightness (HSL) through nonlinear conversion.

6. An apparatus for processing an image to create a grayscale image, the apparatus comprising:
   a color space converter configured to convert, in a color image consisting of a plurality of pixels, a pixel value of each pixel in a RGB color space into a pixel value in a new color space through linear conversion;
   a color information extractor configured to extract color information using the pixel value in the new color space;
   a pixel luminance change amount calculator configured to calculate a luminance change amount of each pixel using the extracted color information; and
   a grayscale image creator configured to combine an original luminance value of each pixel and the luminance change amount for the pixel, and create the grayscale image according to the calculated luminance values,
   wherein the extracted color information reflects the features of colors in the reddish colors and colors in the bluish colors to make colors in the reddish colors brighter in the grayscale image than colors in the bluish color.

7. The apparatus of claim 6, wherein the color space converter performs the linear conversion according to the following equations:

$$m_1 = \alpha_1 * R + \alpha_2 * G + \alpha_3 * B + \alpha_4 \text{ and,}$$

$$m_2 = \beta_1 * R + \beta_2 * G + \beta_3 * B + \beta_4,$$

where $m_1$ denotes a chrominance component value of the reddish colors, $m_2$ denotes a chrominance component value of the bluish colors, and $\alpha_1$, $\alpha_2$, $\alpha_3$, $\alpha_4$, $\beta_1$, $\beta_2$, $\beta_3$ and $\beta_4$ denote constants for the linear conversion.

8. The apparatus of claim 7, wherein the color information extractor generates color information $(m_1-m_2)$ to use to indicate a human-perceived property of the color.

9. The apparatus of claim 7, wherein the luminance change amount calculator calculates the luminance change amount using the following equation:

$$f(m_1-m_2) = k * \text{sgn}(m_1-m_2) * |m_1-m_2|^\alpha,$$

where $f(m_1-m_2)$ denotes the luminance change amount, and k and a are positive numbers.

10. The apparatus of claim 6, wherein the new color space comprises one of color spaces including $YP_BP_R$ and $YC_BC_R$ through linear conversion and color spaces including hue saturation lightness (HSL) through nonlinear conversion.

11. A non-transitory computer readable medium comprising instructions for:
   converting, in a color image consisting of a plurality of pixels, a pixel value of each pixel in a RGB color space into a pixel value in a new color space through linear conversion;
   extracting color information using the pixel value in the new color space;
   calculating a luminance change amount of each pixel using the extracted color information; and
   calculating a luminance value for the grayscale image by combining an original luminance value of each pixel and the luminance change amount, and creating the grayscale image according to the calculated luminance value,
   wherein the extracted color information reflects the features of colors in the reddish colors and colors in the bluish colors to make colors in the reddish colors brighter in the grayscale image than colors in the bluish color.

* * * * *

UNITED STATES PATENT AND TRADEMARK OFFICE
CERTIFICATE OF CORRECTION

| | | |
|---|---|---|
| PATENT NO. | : 8,345,967 B2 | Page 1 of 1 |
| APPLICATION NO. | : 12/615773 | |
| DATED | : January 1, 2013 | |
| INVENTOR(S) | : Tae-Hee Lee et al. | |

It is certified that error appears in the above-identified patent and that said Letters Patent is hereby corrected as shown below:

At column 9, claim number 4, line number 2, after the word "and", please delete the letter "a" and replace with the symbol -- α --.

At column 10, claim number 9, line number 9, after the word "and", please delete the letter "a" and replace with the symbol -- α --.

Signed and Sealed this
Twenty-sixth Day of February, 2013

Teresa Stanek Rea
*Acting Director of the United States Patent and Trademark Office*